Patented Mar. 16, 1948

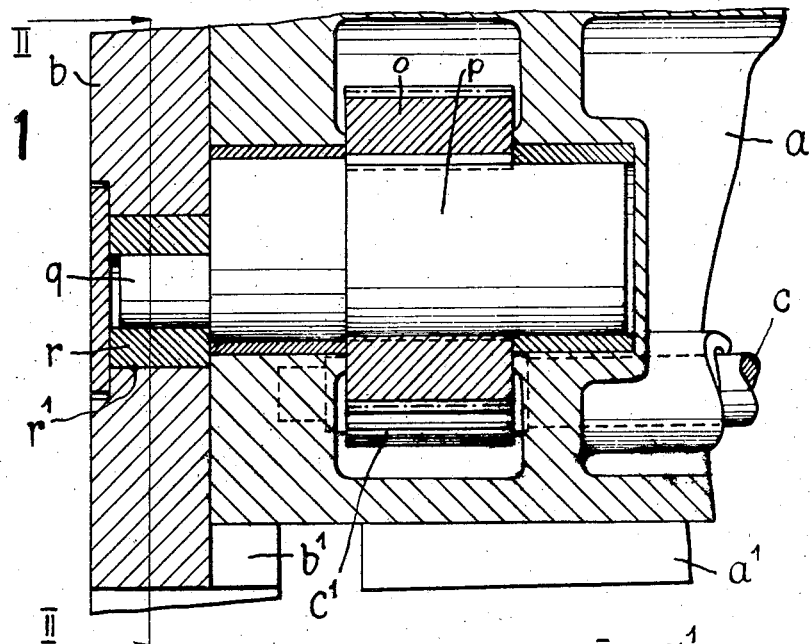
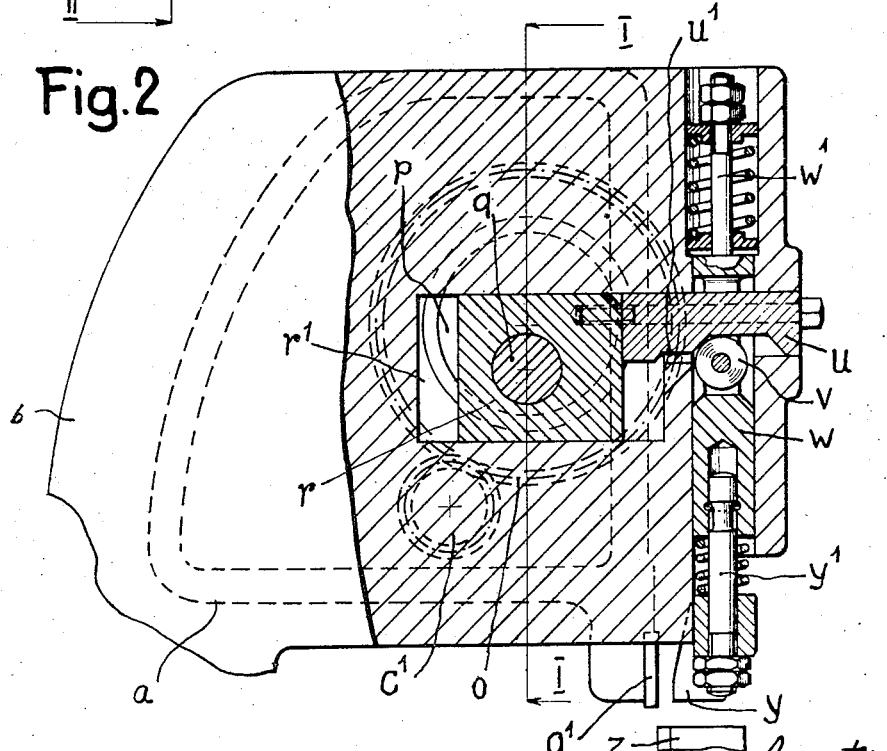

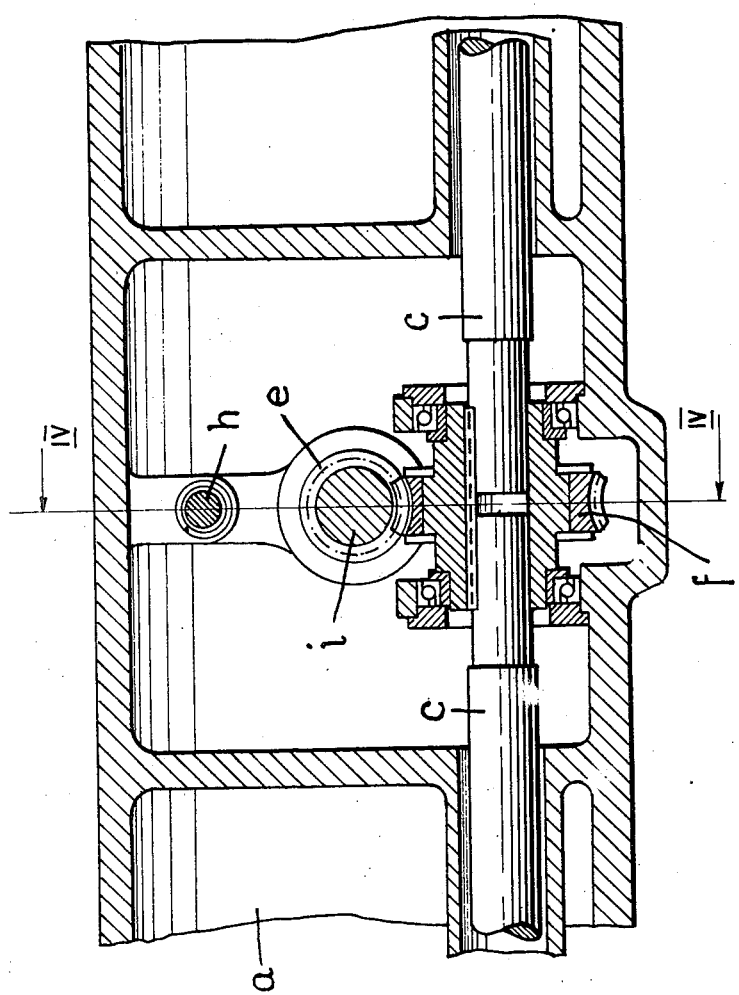

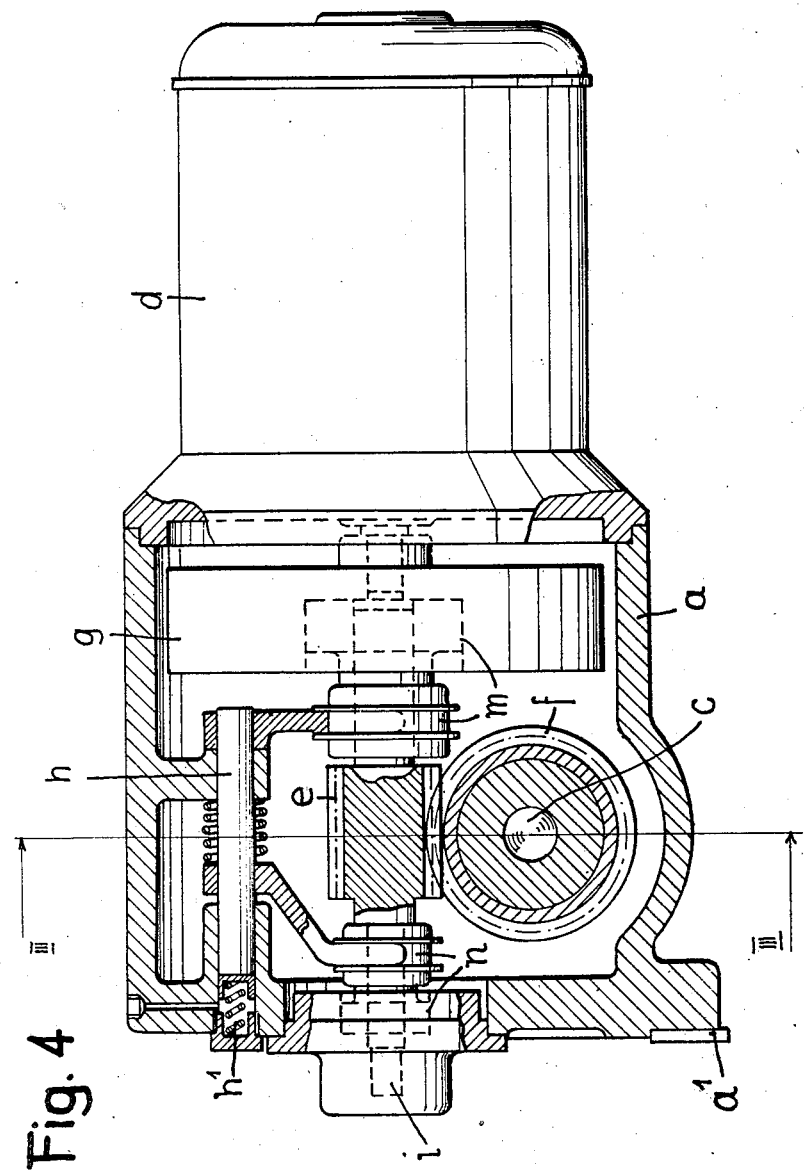

2,437,738

UNITED STATES PATENT OFFICE 2,437,738

SHEARING MACHINE DRIVE

Max Hänggi, Fehren, Switzerland

Application November 26, 1945, Serial No. 630,860
In Switzerland December 4, 1944

3 Claims. (Cl. 164—47)

My present invention relates to improvements in the drive gear for the shear-blade slide and for the hold-down beam in sheet-shearing machines or guillotines having a shear-blade slide guided vertically in stationary lateral frame standards; and the main objects of my improvements are, first, to mount the drive gear for the shear-blade slide on the latter itself, and second, to control the operation of the hold-down beam in dependency from the motion of the said shear-blade slide.

I attain these and related objects by the mechanism illustrated in the accompanying drawing, in which:

Fig. 1 is a longitudinal or axial section, on the line I—I of Fig. 2, through one end portion of the drive;

Fig. 2 a cross-section on the line II—II of Fig. 1;

Fig. 3 a longitudinal or axial section, on the line III—III of Fig. 4, through the intermediate portion of the drive, and Fig. 4 a cross-section on the line IV—IV of Fig. 3.

The movable shear-blade slide $a$ of the guillotine slides in the vertical ways $b$ of the lateral machine-frame portions $b^1$ and carries the shear-blade $a^1$. In this slide $a$ a two-piece drive shaft $c$, running longitudinally thereof, is journaled and on its ends is provided with a pinion $c^1$. An electric motor $d$, secured to the rear of the slide $a$, drives the said shaft $c$. The motor shaft is coupled to a co-axial extension shaft $i$, to which a worm $e$ is keyed which meshes with a worm wheel $f$ keyed to the two facing ends of the said two portions of the shaft $c$. The said extension shaft $i$ also carries a fly-wheel $g$, a clutch $m$ disposed between the latter and the said worm $e$, and the brake $n$. The clutch $m$ and the brake $n$ may be actuated from the outside by means of a push button $h^1$ through the intermediary of a common spring-loaded shift rod $h$ so that whilst the clutch $m$ is engaged the brake $n$ is disengaged, and vice versa. The two pinions $c^1$ on the drive shaft $c$ mesh with two corresponding spur gears $o$, each of which is keyed to a crank shaft $p$ journaled in the shear-blade slide $a$. A pinion $c^1$ as shown in Fig. 1 is provided at both ends of shaft $c$. Each crank shaft $p$ is provided with a crank pin $q$ which is journaled in a slide block $r$. The two slide blocks $r$ in their turn slide in horizontal ways $r^1$ in the lateral standards $b$.

The drive described so far operates so that, when the motor is running with clutch $m$ engaged and brake $n$ disengaged, the two crank shafts $p$ are rotated, as may be readily understood from the operation of the parts shown by dash-and-dot lines in Fig. 2. The rotation of the two crank shafts $p$ thus is resolved, in correspondence with the two slide ways $b^1$ and $r^1$ in the two side standards $b$, into two components, one of which is the drive component for vertically reciprocating the shear-blade slide $a$, while the other is the idling component and causes the horizontal reciprocating of the slide blocks $r$ in the slide ways $r^1$. The stroke of the slide $a$ in its vertical ways $b^1$ corresponds to the eccentricity of the crank pins $q$.

The sheet-shearing machines are commonly provided with a sheet hold-down beam, which serves for the purpose of holding the sheet to be cut down on the machine table before the descending shear-blade $a^1$ starts to cut. This hold-down beam is designated in Fig. 2 by $y$, and is suspended from two spring-loaded slide bolts $y^1$, each of which is slidingly engaged in a bore of the intermediate slide block $w$. The latter in its turn is suspended from a spring-loaded hanger rod $w^1$ and is slotted in its top portion. The said hold-down beam suspensions $y$, $y^1$, $w$ and $w^1$ are housed in vertical guide ways provided in the lateral standards $b$. A cam rod $u$, fastly secured to the appurtenant slide block $r$, projects through the said slotted portion of the blocks $w$ and cams with a roller $v$ pivoted in the latter. When the slide blocks $r$ move forward, the blocks $w$, together with the hold-down beam $y$ suspended therefrom, are depressed, under the influence of the cam portion $u^1$ of the cam rod $u$ on the roller $v$, against the action of the spring-suspension of the bolts $w$ until the hold-down beam $y$ abuts against the sheet placed on the table $z$.

As mentioned above, the co-operation of the top shear-blade slide $a$ and the hold-down beam $y$ is such that the latter always presses the sheet to be cut on to the table prior to the cutting operation proper, in order to prevent an involuntary displacement of the sheet. Such an appropriate co-operation may be readily attained by a corresponding arrangement and adaptation respectively of the parts engaged therein. At the same time, care is taken advantageously for restoring the hold-down beam into its initial position immediately after the cut has been effected.

What I claim and desire to secure by Letters Patent is:

1. In sheet-shearing machines of the character described, a drive for the shear-blade slide vertically guided in fixed lateral machine-frame standards, comprising a drive shaft journaled in said slide, drive means for said drive shaft, a pair of crank shafts also journaled in the said slide, a gear wheel keyed to each end portion of the said drive shaft, a gear wheel fastly secured to each of said crank shafts and adapted to mesh with one of the said drive-shaft gear wheels, a slide block sliding in a horizontal way of each of the said standards and in which an eccentric crank pin on each of the said crank shafts is journaled; the whole in such combination that the rotations transmitted by the said drive shaft onto the said crank shafts are resolved into a vertical drive component effecting the operation of the said slide corresponding to said eccentricity of said crank pins and into a horizontal idling component effecting the displacement of the said slide blocks in said horizontal ways.

2. In a shear-blade slide drive according to claim 1, an electric motor mounted in the said slide, an extension shaft associated with the motor shaft, a worm gear assembly mounted on the said drive shaft and on the said extension shaft for transmitting the motor torque onto the said drive shaft, a clutch mounted on the said extension shaft on one side of the said worm, a brake mounted on the said extension shaft on the other side of the said worm, and control means serving for the purpose of engaging the said clutch while disengaging the said brake and vice versa.

3. In a shear-blade slide drive according to claim 1, a sheet hold-down beam motion coacting with the said slide, comprising a sheet hold-down beam resiliently suspended from a pair of carriers, the latter being spring-supported in the said standards and sliding in vertical guides thereof, and a cam rod fastly secured to each of the said slide blocks; the whole in such combination that upon the forward run of the slide blocks the said cam rods displace the said carriers together with the said beam against the action of their spring-suspensions.

MAX HÄNGGI.

REFERENCES CITED

The following references are of record in the file of this patent:

UNITED STATES PATENTS

| Number | Name | Date |
|---|---|---|
| 930,744 | Dunbar | Aug. 1, 1909 |
| 1,486,825 | Ashman | Mar. 11, 1924 |